Figure 1:
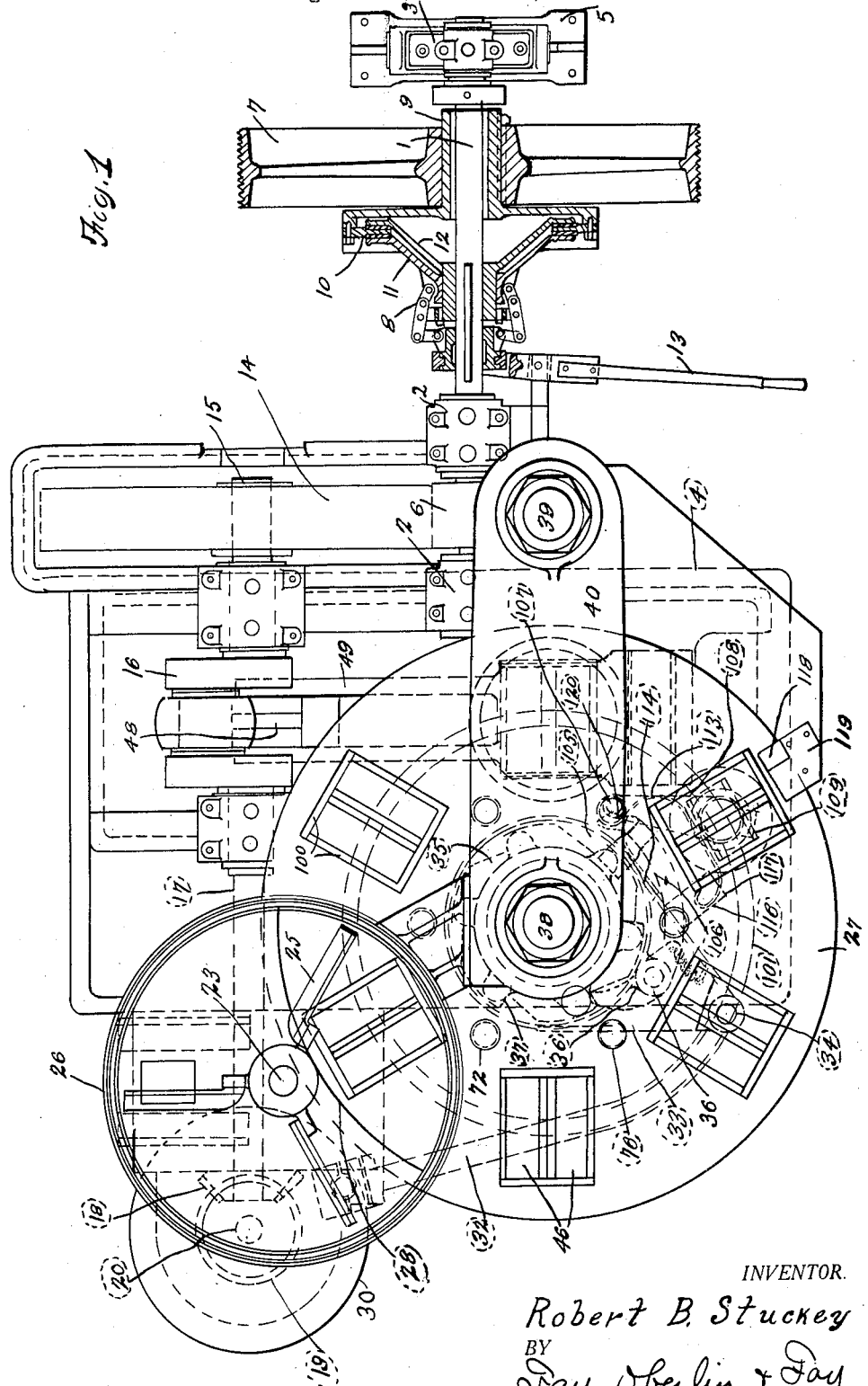

Sept. 5, 1933.  R. B. STUCKEY  1,925,416

BRICK PRESS

Original Filed Nov. 1, 1928  6 Sheets-Sheet 1

Fig. I

INVENTOR.
Robert B. Stuckey
BY
Fay, Oberlin & Fay
ATTORNEYS

Sept. 5, 1933.  R. B. STUCKEY  1,925,416

BRICK PRESS

Original Filed Nov. 1, 1928    6 Sheets-Sheet 2

INVENTOR
Robert B Stuckey
BY Fay Oberlin + Fay
ATTORNEYS

Sept. 5, 1933.  R. B. STUCKEY  1,925,416
BRICK PRESS
Original Filed Nov. 1, 1928  6 Sheets-Sheet 3
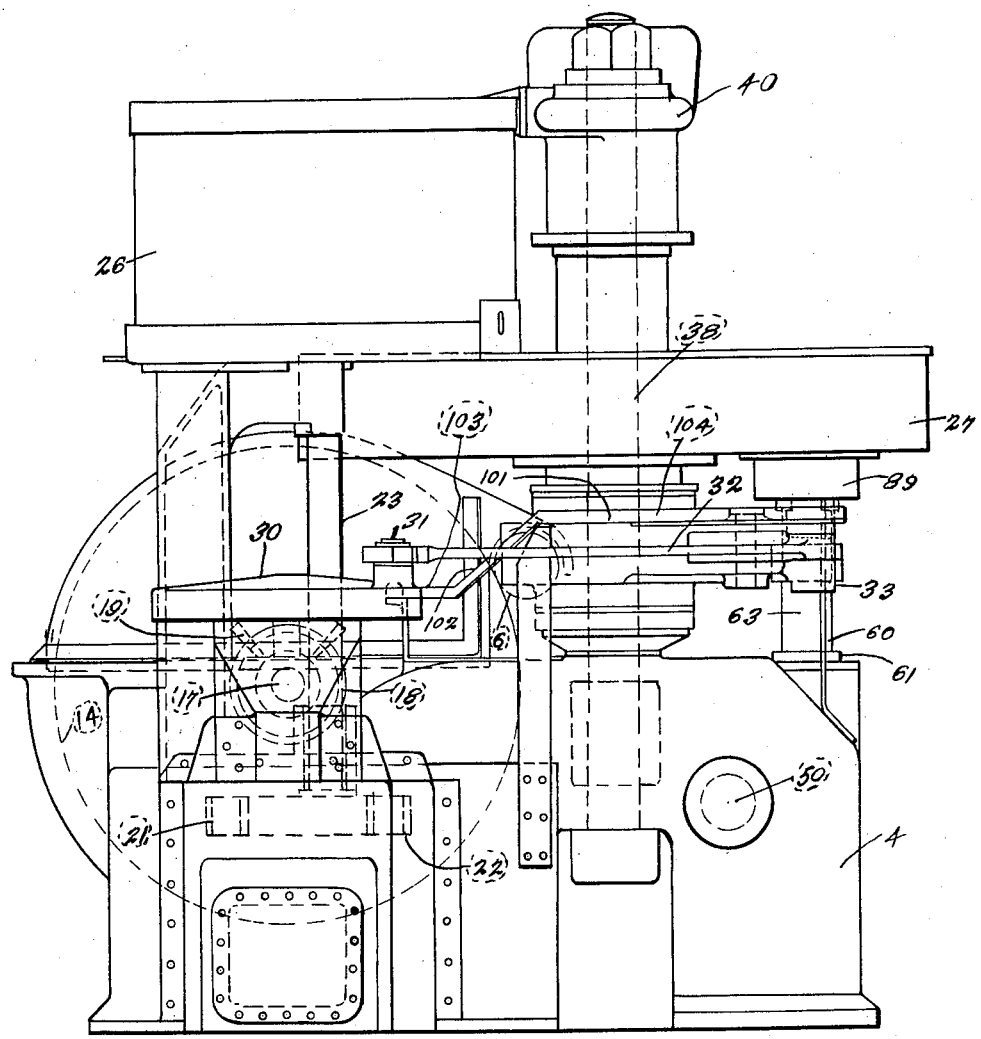
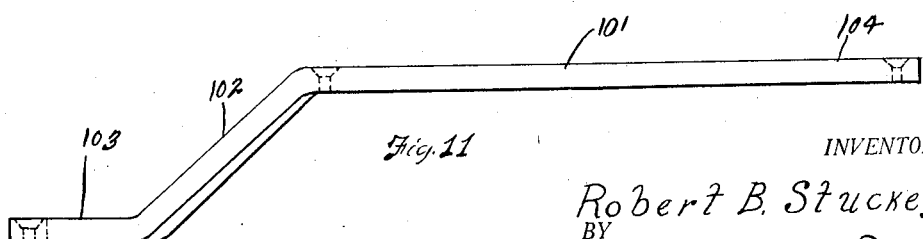
INVENTOR.
Robert B. Stuckey
BY
Fay, Oberlin & Fay
ATTORNEYS Sept. 5, 1933.  R. B. STUCKEY  1,925,416
BRICK PRESS
Original Filed Nov. 1, 1928  6 Sheets-Sheet 4

INVENTOR.
Robert B. Stuckey
BY
Fay, Oberlin & Fay
ATTORNEYS

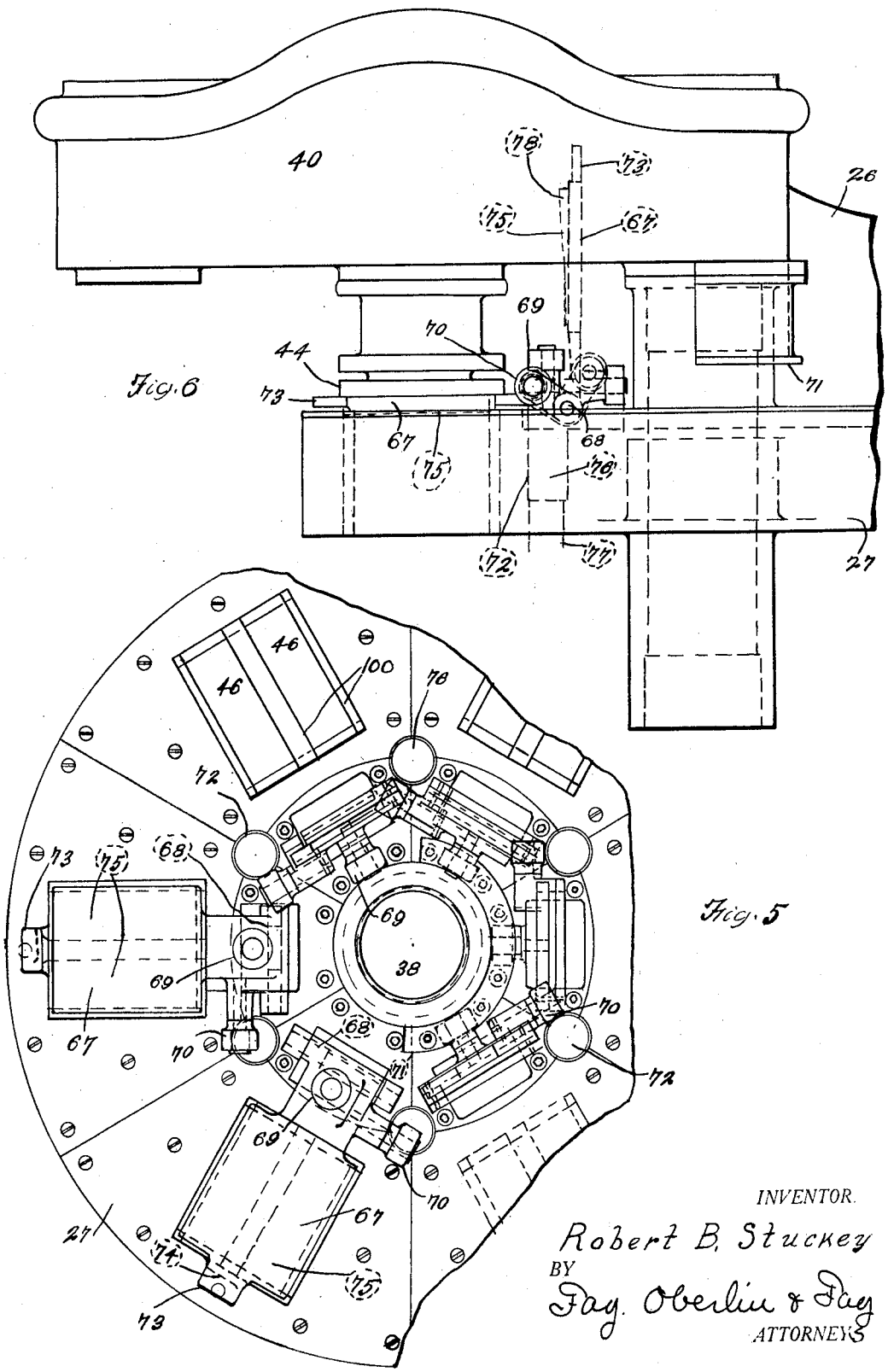

Sept. 5, 1933. R. B. STUCKEY 1,925,416
BRICK PRESS
Original Filed Nov. 1, 1928 6 Sheets-Sheet 6

INVENTOR.
Robert B. Stuckey
BY
Fay, Oberlin & Fay
ATTORNEYS

Patented Sept. 5, 1933

1,925,416

UNITED STATES PATENT OFFICE 1,925,416

BRICK PRESS

Robert B. Stuckey, Bucyrus, Ohio, assignor to W. A. Riddell Company, Bucyrus, Ohio, a corporation of Ohio Application November 1, 1928. Serial No. 316,514
Renewed December 2, 1931

22 Claims. (Cl. 25—68)

The present invention, relating, as indicated, to brick presses, has more particular reference to presses of the rotary type, and its principal object, broadly stated, is to better adapt such machines for use in connection with those manufacturing processes wherein a dry or semi-dry material is being shaped.

Rotary presses of the kind referred to have heretofore been constructed in such a manner that the top surface of the mold contents rubbed against the counter pressure plate or mold top during the time when such molds were being shifted into the pressing position. This rubbing, especially when the mold charge contains a practically dry abrasive material, such as silica, is objectionable because of its tendency to cut such pressure plate and make necessary its frequent replacement. Also the arrangement of this plate is such as to make it impossible to manufacture wedge shaped bricks by forming the upper and lower tapered surfaces in contact with the respective top and bottom pressure plates, and its position in the necessarily close relation to the table produces rapid wear upon the top surface of such table, it being understood that the plate referred to forms the tops of the bricks and is closely mounted with respect to the top of the table in order to avoid "finning" of the bricks produced. A further undesirable feature of these machines is that during ejection of the finished bricks from the molds, the pressure standards ride up an inclined track; this results in forcing such standards against the sides of the mold liners with the consequence that said liners soon become badly worn and need to be replaced.

My invention, with the object of improving rotary and other presses of the general design above described contemplates providing lids for the molds, these lids being adapted to carry under pressure plates which will enter the mold cavities and form the top surfaces of the bricks being pressed. Such arrangement makes it possible to mount the counter pressure assembly in spaced relation to the table, thus avoiding friction between these parts and also between the mold contents and the parts which form the tops of the bricks. Further advantageous features of this improvement are that wedge shaped or segment bricks can be readily produced and that "finning" of the bricks is completely avoided. A further advance provided by this invention is means for vertically lifting the pressure standards during ejection of the bricks, this means taking the form of a reciprocable plunger which operates in timed relation to the pressing mechanism and avoids wear on the mold liners due to the lift-out motion having a lateral component which forces the pressure standards against such liners. Among its other objects, my invention also aims to provide: means for loosening the mold lids prior to ejection of the finished bricks and prior to elevation of such lids; means for holding the lids in elevated position after having been raised, but before passing under the track which maintains such position until the lids are again lowered; means for holding the pressure standards in their elevated pressing position while such standards are being transferred to the lift out mechanism; means for holding such standards in their elevated ejection position until the operator has had sufficient time within which to remove the finished bricks, and means for insuring that the thick and thin ends of wedge shaped bricks (when being produced) shall be uniformly dense, this means comprising apparatus for tilting the lower pressure plates during charging of the molds in order to reduce the amount of material entering to fill the small ends of the mold cavities.

To the accomplishment of the foregoing and related ends, said invention, then consists of the means hereinafter fully described and particularly pointed out in the claims; the annexed drawings and the following description setting forth in detail certain structure embodying the invention, such disclosed means constituting, however, but one of various mechanical forms in which the principle of the invention may be used.

In said annexed drawings:—

Figure 2:
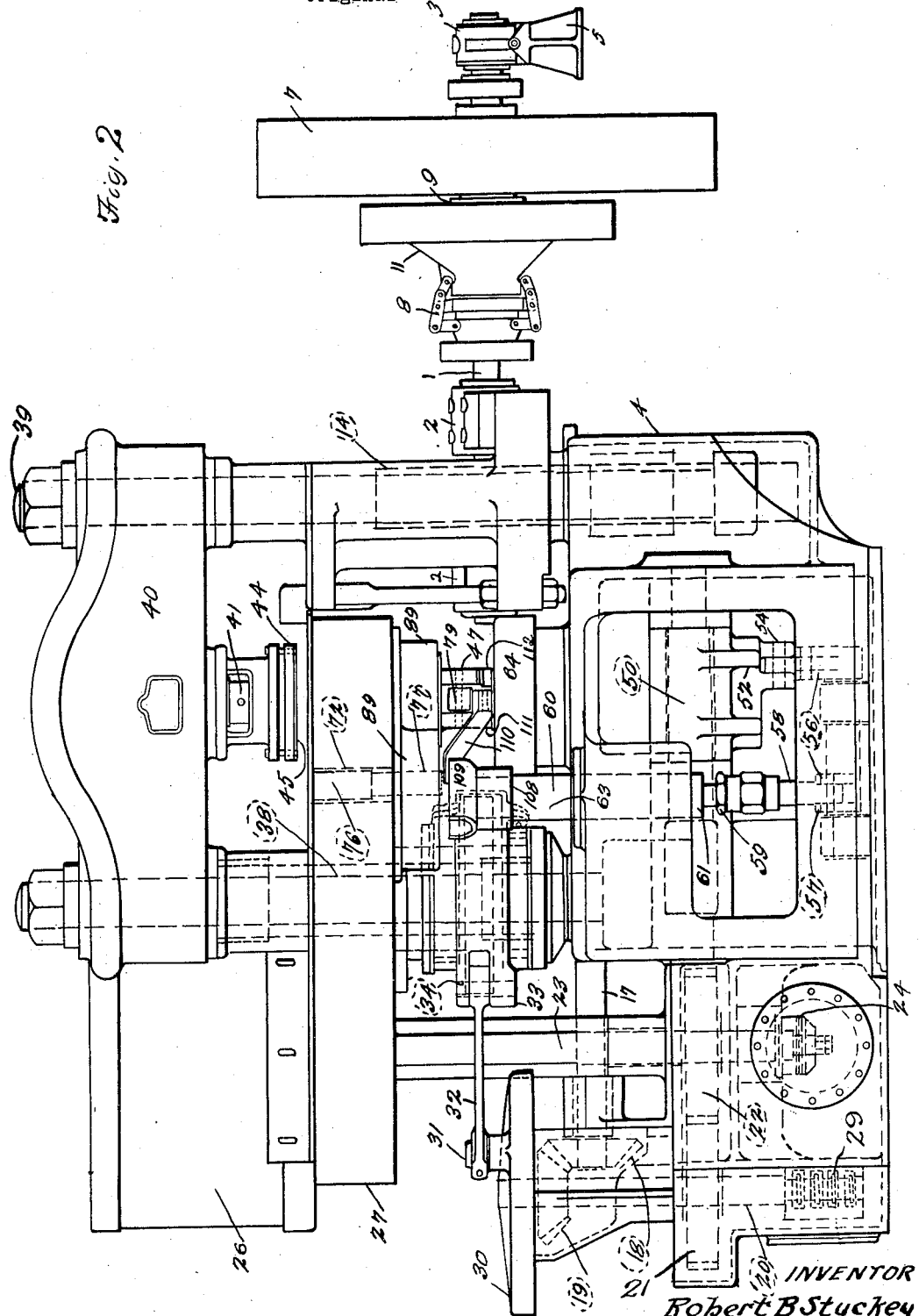
Figure 4:
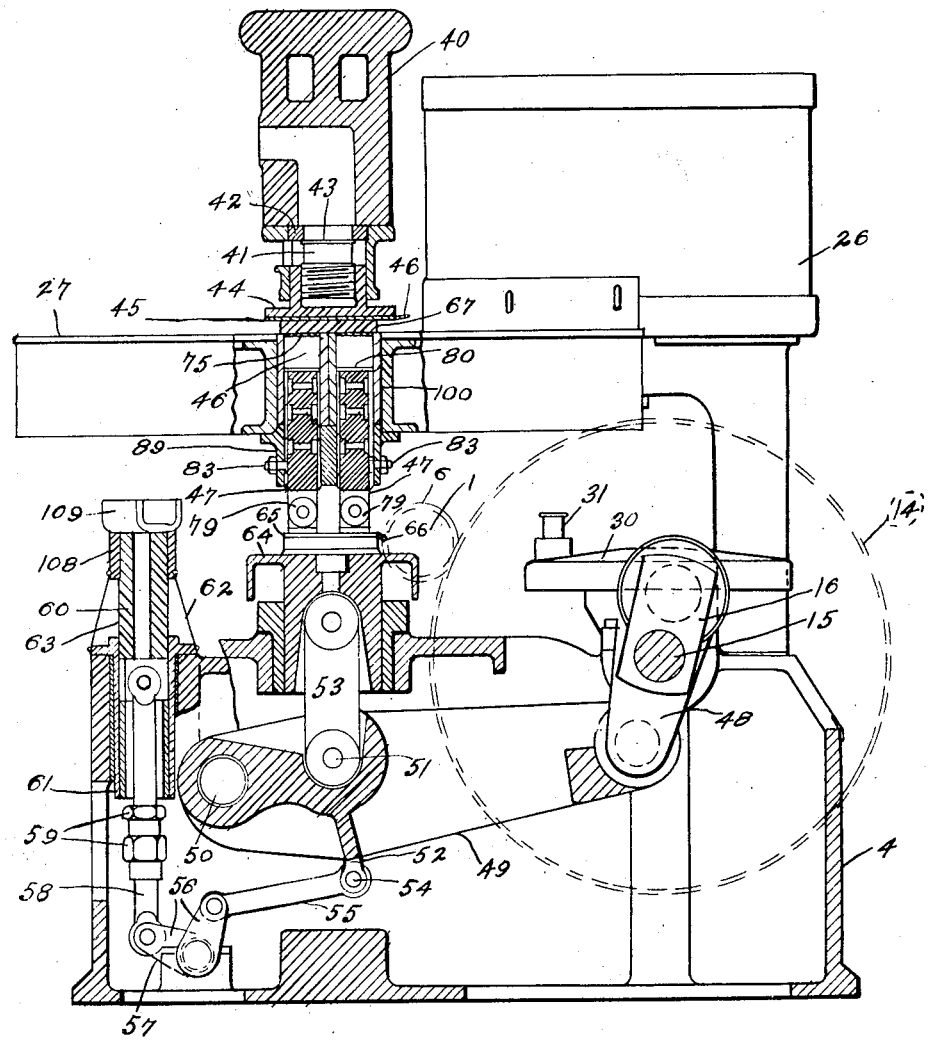
Figure 8:
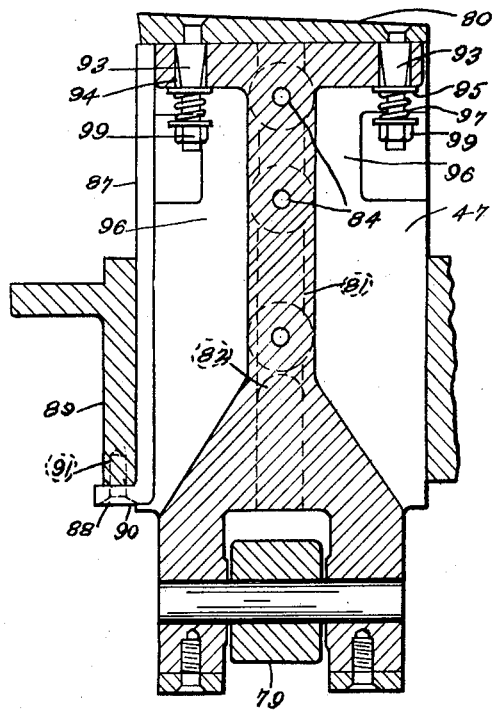
Figure 10:
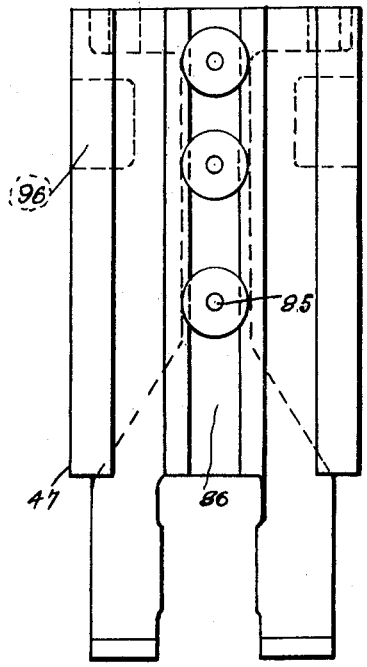
Figure 9:
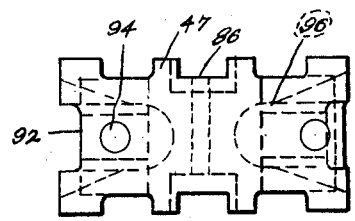
Figure 7:
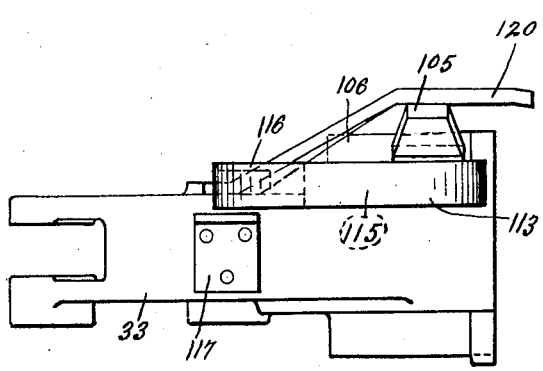

Fig. 1 is a partly sectional plan view of a rotary press embodying the present improvements; Figs. 2 and 3 are respectively front and end elevations of the machine shown in Fig. 1, certain of the parts being omitted; Fig. 4 is a partly broken away and partly sectional view showing details of the pressing and lift-out mechanism; Fig. 5 is a more or less diagrammatic view showing the table top and its associated mold lids; Fig. 6 is a fragmentary elevation illustrating further features of the mold lids and showing their manner of operation; Fig. 7 is a side elevational view of a part of the ratchet housing and its associated lid plunger track and pressure standards retaining spring; Fig. 8 is a vertical longitudinal section through a pressure standard and its attached lower pressure plate, this view also showing part of a pressure standard guide; Fig. 9 is a plan view of the pressure standard shown in Fig. 8; Fig. 10 is a side elevation of the pressure standard shown sectionally in Fig. 8 and in plan in Fig. 9; and Fig. 11 is a detailed side elevational view of the mold track shown in Figs. 1 and 3.

In the drawings, and with particular reference to Figs. 1 to 6, inclusive, my invention is shown as comprising a main drive shaft 1 which is journaled in bearings 2 and 3, the former being mounted upon the base 4 and the latter being adjustably supported by a floor stand 5. Between the base bearings 2 the shaft 1 carries a pinion 6, and between the outer of such bearings and the floor stand 5 such shaft carries a pulley 7 and a clutch 8. The pulley 7 is mounted upon a hub 9 which is provided with a friction disc 10, and the clutch 8 has two parts 11 and 12 which are movable relatively to such disc by a lever 13, this lever, through the mechanism shown, being effective to engage or release said clutch as desired. The pinion 6 meshes with a gear 14, and this gear is mounted upon a suitably journalled shaft 15 which is formed with a crank 16 and has an extension 17 provided with a bevel gear 18. The bevel gear 18 meshes with a similar gear 19 which is secured to a vertical shaft 20, and this shaft also carries a spur gear 21 which engages with another spur gear 22, this latter gear being secured to a second vertical shaft 23. The shaft 23 at its bottom cooperates with a thrust bearing 24 and at its top carries a plurality of feeder blades 25, these being positioned within a hopper 26 which overlies part of the table 27 and has a bottom opening 28. The shaft 20 at its lower end is supported by a thrust bearing 29 and at its upper end carries a disc 30 which is provided with a crank pin 31. To the crank pin 31 is fastened one end of a connecting rod 32, which at its other end is secured to the ratchet housing 33 by a pin 34. The ratchet housing 33 encloses a ratchet 35 and a pawl 36, the former being secured to the table 27 and the latter coacting with the teeth 37 to give such table a step-by-step rotary motion in the manner hereinafter more fully described.

The table 27 is revolubly mounted upon a center post 38 and this post, together with the similar post 39, supports a yoke member 40. Near its center, the yoke 40 is provided with a combination counter pressure assembly and relief device, this taking the form of an adjustable punch 41 and a die 42, between which a relief plate 43 may be secured in the manner illustrated in Fig. 4. The punch 41 is threaded into a part 44 and this part on its bottom removably carries a wear plate 45 which, in a direction opposite to the direction of motion of the table 27, has an upturned end 46' (see Fig. 4). The wear plate 45 is mounted directly over the molds 46 when such molds are in the pressing position and, up to a certain limit determined by the relief plate 43, functions to buck the pressure exerted by the pressure standards 47 such standards being reciprocably mounted within downward extensions of the molds and being operated indirectly by the crank 16.

The crank 16 carries the upper end of a link connection 48, which, at its lower end, supports the distal end of a lever 49, this lever being pivoted to a shaft 50 and having a transverse member 51 and downwardly directed lugs 52. The member 51 carries the lower end of a thrust piece 53 and the lugs 52 carry a pin 54, which mounts one end of a link 55. The link 55 at its other end connects with a bell crank lever 56, and this lever, or rather one of its extensions 57, connects with a member 58 which may be provided with axial adjusting nuts 59 and pivots to the lift-out or ejector 60, this ejector 60 being reciprocably mounted within a bushing 61 and having a flexible sleeve 62 surrounding and protecting its working length 63. The thrust piece 53 has its upper end pivoted within a reciprocably mounted block 64 and this block carries two wear plates 65 which have downturned extremities 66 (see Fig. 4).

The table 27 carries a plurality of lids 67, these lids being pivoted as at 68 and having rollers 69 and 70, the former being adapted to engage under a track 71 when such lids are in their raised positions and the latter being adapted to assume positions over the openings 72 when such lids are lowered. In addition each lid is provided with a forwardly extending lug 73 which has an inclined surface 74 and on its under surface removably carries the upper pressure plates or mold tops 75, such plates being designed to enter the mold cavities to form the upper surfaces of the bricks. Within each of the openings 72 a plunger 76 is positioned, such plungers having lower extremities 77 which depend below the bottom of the table 27. When wedge shaped bricks are being manufactured the plates 75, or more exactly speaking, their under surfaces 78, are tapered from their front ends to their rear ends, as shown in Fig. 6.

The lower ends of the pressure standards 47 are provided with rollers 79 and their upper ends carry the lower pressure plates or mold bottoms 80, such bottoms being tapered similarly to the plates 75 when wedge shaped bricks are being pressed. The downward motion of these pressure standards is limited by the parts 81 which have concave lower ends 82 adapted to seat on the heads of the bolts 83 and upper ends provided with holes 84, through which screws or bolts may be passed into the openings 85, these parts being positioned within the side grooves 86. The stops 87 have turned ends 88 which are adapted to be attached to the lower faces of the pressure standard guides 89 by screws passing through the openings 90 and into the holes 91 and the upper ends of such stops lie within the grooves 92. When the pressure standards are in their lowermost positions, such stops operate to lift the thick ends of the mold bottoms 80 to thereby reduce the capacity of the small end of the mold cavity to compensate for the difference in the amount to which the material placed within the small end of such cavity must be compressed. In other words, if these tapered bottom plates were permitted to retain their normal positions with their under surfaces in contact with the tops of the pressure standards, the thin end of each wedge shaped brick produced would be more dense than the thick end, this because the thick ends of the plates 75 and the thick ends of the bottoms 80 are positioned in the same parts of the mold cavities during pressing. In order to permit of elevating the thick ends of the bottoms 80 when the mold cavities are being charged, such bottoms are provided with shanks 93 which extend through openings 94 in the top of the pressure standards and have washers 95 that bear against the top surface of the hollows 96, these washers forming seats for the springs 97 which rest upon other washers supported by the nuts 99. Furthermore the shanks 93 are tapered in the manner shown, and so also are the thick ends of the mold bottoms, these features making it possible to tilt or incline such bottoms even though they fit snugly within the mold liners 100.

Beneath the table 27 is a track 101, a section of which has an incline 102, an end 103 and an end 104, this latter end extending up and over the ratchet housing 33. Mounted upon such housing by means of a suitable bracket 105 is a track 106, this track being provided for the purpose of holding the plungers 76 in elevated position until the rollers 69 have been moved under the track 71 by rotation of the table 27. The initial elevation of such plungers is effected by a pin 107, which is carried vertically in the outer end of an arm 108, this arm being fastened to the ejector 60. This ejector at its top carries a block 109 to which is pinned one end of a track 110, the other end of such track being pinned between parts 111 and 112, these being attached to the top of the block 64. After the pressure standards have been elevated and one or more bricks thereby pressed the ejector and the block 64 descends but the pressure standards during rotation of the table which occurs simultaneously do not descend, these riding on the inclined track 110 onto the top of the block 109 preparatory to ejection when next the ejector or lift-out is elevated. When the pressure standards have been elevated and the bricks in the molds raised so that their lower surfaces are flush with the top of the table it is desirable to hold such standards in this elevated position to allow an operator sufficient time to remove the finished bricks. The upper end 104 of the track 101 which is positioned above the ratchet housing 33 serves the purpose above explained, but some means is necessary for holding the pressure standards in the extreme upper positions imparted by the ejector during the time when such standards are being moved from the ejector station to the next station where the track part 104 becomes effective. This means in the present machine comprises a spring 113 which has a part 114 designed for attachment to a pad 115 on the ratchet housing and a part 116 which rests on a bracket 117 carried by such housing, this spring engaging under the pressure standards after their elevation by the ejector 60 and functioning to hold such standards in their extreme upper positions, while the table moves to the next station and until the end 104 of the track 101 gets beneath the rollers 79.

In operation, a suitable raw material, such as the dry or semi-dry mixture used in the manufacture of sand-lime or silica fire bricks is placed in the hopper 26 and the blades 25 revolve to force such material down through the opening 28 and into the mold cavities. It will first be assumed that wedge shaped bricks are being pressed and that the upper and lower pressure plates are of the tapered variety heretofore described. The press illustrated is adapted to make two bricks at a time, one in each of the adjacent mold cavities. As heretofore explained, the thick end of each lower pressure plate is elevated during charging of the molds, this being for the purpose of reducing the amount to which the thin ends of the bricks would be compressed if such plates were permitted to remain in contact with the tops of the pressure standards during charging or filling of the molds. After having been filled, the molds under consideration move from under the hopper 26 and all surplus material is of course held back by the wall of such hopper. When the molds arrive at the next station, or that between the charging and pressing positions, the corresponding lid (which has heretofore been carried around in an elevated or erect relation to the molds) drops, due to its roller 69 having passed the contiguous end of the track 71. In dropping, such lid, or rather the upper pressure plates attached thereto, enter the mold cavities and compress the material therein sufficiently to allow the top surface of the lid to assume a substantially horizontal position. The table 27 now moves another step to the pressing station, and during this movement the upturned end 46 of the plate 45 operates to completely close the lid and force its attached pressure plates completely into the mold cavities, while the down turned extremities of the wear plates 65 pick up the pressure standards and guide them onto the parts of such plates which are mounted directly on top of the block 64. When the molds have been thus positioned, the block 64 is elevated in the manner previously explained and the contents of the molds are pressed into bricks of the same shape as the confining cavities. Due to the inclination of the lower pressure plates, the pressure standards, during the initial part of their upward motion will move only the thin ends of such plates, their thick ends not being elevated until such thin ends have compressed the thick parts of the mold contents by an amount depending upon the distance between the inclined ends of the pressure plates and the corresponding ends of the pressure standards. In other words, the raised ends of such plates remain practically stationary until the pressure standards have been elevated sufficiently to come into contact with such ends. When this happens both ends of the bricks are compressed simultaneously but of course the thick ends thereof have received additional pressure prior to this time which was of the proper amount to insure that both ends are of uniform density when the pressing has been completed. As the block 64 begins to descend, the ratchet mechanism comes into operation and moves the table on to the next or ejecting station. It has been stated that the pressure standard should be held in their elevated positions during this movement and until positioned on top of the block 109. For holding such standards in the indicated positions, the track 110 is provided, and during the motion referred to the rollers 79 ride on this track. When the block 64 is descending the block 109 is also descending but the inclination of the track 110 is such as to maintain the pressure standards at the same elevation during their travel from the pressing to the lift-out station. When now the table again comes to rest, the pressure standards will be positioned on the block 109. During the succeeding pressing operation such block will be raised and the lower pressure plates will be brought to a position substantially flush with the top of the table, the pressed bricks of course being now positioned above the table and within reach of an operator.

Before the molds under consideration have entirely reached the ejecting station, the lid-lug 73, or more exactly speaking its inclined surface 74 will have come into contact with the complementally inclined surface 118 of the member 119, and such lid will have thereby been loosened and slightly raised. During the ejecting operation above explained, the pin 107 will contact with the bottom of the plunger 76 and lift such plunger vertically, this being effective to raise the lid at the same time as the finished bricks are being ejected because the arm 108 is attached to, and moves with, the ejector 60. When ejection of the finished bricks has been completed, the ratchet housing 33 will begin to advance the table another step. During such ejection the said housing will have moved into the necessary position and the spring 113 will have come under the lower ends of the pressure standards, and the track 106 will have come under a part of the lower end of the plunger 76, such end being now supported by the pin 107. As the ratchet housing begins its return motion and carries the table on to the next station, the plunger 76 will be supported by the track 106 and the pressure standards will be held in their elevated positions by the spring 113, it being understood that both the pin 107 and the ejector 60 have begun to descend. As revolution of the table continues, the pressure standard rollers 79 come onto the end 104 of the track 101, and the lid roller 69 comes under the track 71. When the ratchet starts its reverse movement towards the pressing station, the spring 113 will pass out from under the pressure standards and the track 106, or rather its highest part 120, will pass out from under the plunger 76, but the pressure standards will not descend because supported by the track 101, nor will the lid drop because its roller 69 is now beneath the track 71. During the next rotary movement of the table, the pressure standard rollers 79 will ride down the track incline 102 preparatory to being recharged and the above explained cycle of operations will be repeated. The springs 97 will insure that the lower pressure plates again assume their normal positions and avoid any liability of such plates being held in elevated positions because of their contacting with the liners of the mold cavities.

From the foregoing description it will be apparent that my invention provides an improved rotary press which, among its other features, provides means for avoiding contact between any part of the counter pressure assembly and the top of the mold table or mold contents during rotation of such table, means for completely preventing finning of the bricks; means for permitting of the manufacture of wedge shaped bricks without providing especially shaped mold cavities; means for vertically elevating the pressure standards during ejection of the finished bricks; means for effecting necessary movements of the mold lids; and means for holding such lids and the pressure standards in such positions as are preferable during their respective cycles of operation. It will be apparent that the machine illustrated can be used with most any material and that other products such as salt blocks, briquettes, etc. can be pressed in the manner hereinbefore explained in connection with the making of silica fire bricks. It will also be apparent that the wedge shaped pressure plates shown and described can be replaced by suitable flat plates when ordinary bricks are being pressed; that with suitable adjustments or substitutions, bricks of a great variety of sizes can be produced; that machines of smaller capacity can be provided with one instead of two molds as shown; and that within the limits of common practice such modifications may be made as are necessary or desirable for adaptation purposes.

Furthermore, it will be apparent that my invention provides a rotary press for the formation of tiles, bricks, blocks, etc., which is of such construction as to make it possible to produce products having an upper surface which is either monogrammed, ornamented or lettered or which is especially shaped, i. e. convex or concave or made with chamfered edges, by suitably altering the upper pressure plate according to the effect desired. And it will be understood that while certain features of my invention, as for example the tiltable lower pressure plates, have been specifically described with relation to their use in connection with rotary presses, they are also of such character as to be advantageously usable on other types of presses such as those commonly designated as vertical, for example. In the normal operation of a machine of the sort described the falling of the upper pressure plates is effective to perform and to some degree press the material within the mold cavities, and such falling it should be noted is also of material advantage because of the tendency it has to produce better edges upon the articles being formed. The lids which carry the upper pressure plates obviously need not be in the form of covers, as their primary function is to pivotally support such plates in the operative manner hereinbefore described, and to this end a skeletal framework might be equally satisfactory. When a rotary press of the type provided by the present invention is being operated rather continuously, it is found desirable to provide fixed cams for insuring that the door lifting plungers descend in the intended manner, for positively moving the lids out of their substantially vertical position after the charging hopper has been passed, and for forcing down any pressure standard which does not recede completely to its lowermost or charging position. It is also preferable to provide a brake for controlling the movements of the table, and if desired a lug may be moved or rotated into such a position as to coact with such table and act as a positive stop in case the brake becomes ineffective or the table for any other reason tends to revolve further than intended.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. In a rotary press, the combination of a mold, a bottom for said mold, and a top for said mold, said top being hingedly mounted on a rotary table, so as to enter the mold at the proper time.

2. In a rotary press, the combination of a rotary table, molds in such table, lids for such molds carried by said rotary table, means for raising such lids, and means for holding such lids in raised position.

3. In a press, the combination of a rotary table, molds in such table, hinged lids carried by said table for said molds, and mold tops carried by such lids, said tops being adapted to enter such molds.

4. In a press, the combination of a mold, a tapered tiltable bottom for such mold, resilient means for maintaining such bottom in the normal position, and means for tilting such bottom.

5. In a press, the combination of a mold, a tapered bottom for such mold, means for tilting such bottom, a tapered top for said mold, and means for pivotally supporting such top.

6. In a rotary press, a table, a mold in such table, a bottom for such mold, means for moving said bottom vertically for pressing a charge in such mold, means for later elevating said moving means for ejecting such pressed charge, means for shifting said mold from said moving means to said ejecting means, and continuous means for holding said bottom in the position given by such moving means during the movement of said mold to said ejecting means.

7. In a rotary press, the combination of a table, molds in such table, lids for said molds, said lids carrying tops adapted to enter said molds, means for pressing a charge in such molds, means for loosening such lids after such pressing, and means for then elevating said lids and withdrawing said tops.

8. In a rotary press, the combination of a mold, a tapered top adapted to enter said mold, a tapered bottom within said mold, means for charging said mold, and means for holding said bottom in tilted position during such charging.

9. In a rotary press, the combination of a table, molds carried by such table, lids for such molds, means for loosening such lids after a pressing operation, and means for then raising such lids.

10. In a press, the combination of a rotary table, molds in said table, bottoms for such molds, and hinged lids for such molds carried by said table, said bottoms being positioned in such molds, and said lids having parts adapted to enter such molds.

11. A brick press comprising a mold, a lid for said mold, a tiltable bottom for said mold, resilient means for causing said bottom to assume its normal position, and means for tilting said bottom as it approaches the lower portion of said mold.

12. A brick press comprising a table, a mold in such table, a bottom for such mold, a top for such mold, means for moving said bottom towards said top, said top and bottom having inclined forming surfaces, and a mount for such bottom, said mount being arranged so that during the initial part of its motion towards said top the said bottom will first move arcuately around one of its ends as a center.

13. A brick press comprising a rotary table, molds in such table, reciprocable means for pressing bricks in said molds, means for raising said pressing means into pressing position, means for later raising said pressing means to ejecting position, and a continuous track bridging the space between said raising and said ejecting means, said track functioning to hold said pressing means in pressing position during its motion from said raising to said ejecting means.

14. A brick press comprising a table, a mold in such table, a top for said mold, a bottom for said mold, said top and bottom having inclined forming surfaces, means for moving said bottom, means for holding said bottom in inclined relation to said moving means, and means tending to move said bottom towards said moving means.

15. A press comprising a mold having a bottom, means for elevating said bottom for pressing a charge in said mold, means for then shifting said mold, and means for then further elevating said bottom to remove said pressed charge from said mold, said first and last named means being operably interconnected and simultaneously operable while said mold is stationary.

16. A press comprising a mold having a bottom, means for elevating said bottom to press a charge in said mold, means for then further elevating said bottom to eject such pressed charge from said mold, spaced fixed means for holding said bottom in said last-named elevated position, means for moving said mold towards said holding means, and means for supporting said bottom during such movement.

17. A press comprising a mold, a lid for said mold, means for lifting such lid, spaced means for holding such lid in raised position, means for moving said mold and lid towards said lid holding means, and means for maintaining said lid in raised position during such movement.

18. A brick press comprising a mold, an upper die block for said mold, a lower die block, a die plate pivotally positioned on said lower die block, means secured to said die plate and adapted to project through said die block, resilient means associated with said projecting means to cause said die plate to asume its normal position on said die block, and means for tilting said die plate.

19. A brick press comprising a mold, an upper die block for said mold, a lower die block, a die plate pivotally positioned on said lower die block, resilient means associated with said lower die block and said die plate to cause said plate to assume its normal position as such lower die block is in discharging position, and means for tilting said plate as such lower die block is in position to receive the material to be pressed.

20. In a press of the character described, the combination of a rotary mold carrying table, a pressure member, a counterpressure member, said members arranged to compress the material in a mold at one station of said table, and a pressure plate supported separate from said pressure members and mounted for movement relative thereto adapted by such relative movement to be interposed between said table and one of said members during the pressing operation.

21. In a press of the character described, the combination of a rotary mold carrying table, a pressure member, a counter-pressure member, said members arranged to compress the material in a mold at one station of said table, and a pressure plate supported separate from said pressure members and mounted for movement relative thereto adapted by such relative movement to be interposed between said table and said counter-pressure member during the pressing operation.

22. In a press of the character described, the combination of a rotary mold carrying table, a pressure member, a counter-pressure member, said members arranged to compress the material in a mold at one station of said table, and a pressure plate supported separate from said pressure members and mounted for movement relative thereto adapted by such relative movement to be interposed between said table and said counter-pressure member during the pressing operation, said pressure plate having a projection adapted to enter into and close one end of a mold.

ROBERT B. STUCKEY.